(12) United States Patent
Miyake et al.

(10) Patent No.: US 7,982,663 B2
(45) Date of Patent: Jul. 19, 2011

(54) DIGITAL SIGNAL PROCESSOR

(75) Inventors: Yasuyuki Miyake, Toyota (JP); Hisanori Uda, Nagoya (JP)

(73) Assignee: Denso Corporation, Kariya (JP)

( * ) Notice: Subject to any disclaimer, the term of this patent is extended or adjusted under 35 U.S.C. 154(b) by 87 days.

(21) Appl. No.: 12/583,268

(22) Filed: Aug. 18, 2009

(65) Prior Publication Data

US 2010/0056070 A1 Mar. 4, 2010

(30) Foreign Application Priority Data

Aug. 26, 2008 (JP) ................................ 2008-216611

(51) Int. Cl.
*G01S 7/40* (2006.01)
(52) U.S. Cl. ........................................ 342/165; 341/118
(58) Field of Classification Search ........... 342/165–174
See application file for complete search history.

(56) References Cited

U.S. PATENT DOCUMENTS

| | | | | |
|---|---|---|---|---|
| 5,731,772 | A | * | 3/1998 | Mikkola et al. ............... 341/118 |
| 7,545,321 | B2 | * | 6/2009 | Kawasaki ..................... 342/368 |

OTHER PUBLICATIONS

Hans-Martin Rein et al., "A Symmetrical Analog Wide-band Multiplier IC Operating up to 8Gb/s", IEEE, ISSCC, 1991, pp. 118-119.

* cited by examiner

*Primary Examiner* — Thomas H Tarcza
*Assistant Examiner* — Timothy A Brainard
(74) *Attorney, Agent, or Firm* — Harness, Dickey & Pierce, PLC

(57) ABSTRACT

The digital signal processor is for correcting a DC output at an output terminal of an internal circuit of an analog circuit device. The digital signal processor includes a digital register for storing a digital value, a D/A converter for converting the digital value stored in the digital register into an analog voltage and applying the converted analog voltage to the output terminal as the DC output, a polarity determining circuit which outputs a first signal when an analog DC voltage at a reference correction point different from the output terminal in the internal circuit is higher than a predetermined threshold value and otherwise outputs a second signal, and an updating function configured to monotonously increase or decrease the digital value stored in the digital register while a predetermined one of the first and second signals is outputted from the polarity determining circuit.

3 Claims, 7 Drawing Sheets

US 7,982,663 B2

DIGITAL SIGNAL PROCESSOR

CROSS-REFERENCE TO RELATED APPLICATION

This application is related to Japanese Patent Application No. 2008-216611 filed on Aug. 26, 2008, the contents of which are hereby incorporated by reference.

BACKGROUND OF THE INVENTION

1. Field of the Invention

The present invention relates to a digital signal processor (DSP) for controlling an analog circuit device. The present invention can be advantageously used to control phase shifters of antennas of a phased array radar.

2. Description of Related Art

A structure of a typical phased array radar is explained in the following. FIG. 5 is a block diagram showing a structure of a phased array radar 100 including n (n being an integer larger than 1) transmitting/receiving antennas. In the description hereinafter, the term "phase shifter" means an infinite phase shifter. Here, n transceivers of the phased array radar 100 are referred to as a branch-1, a branch-2, ..., a branch-n. Taking the branch-n as an example, a local oscillator 10 generates a high-frequency wave cos ωt, and a phase shifter 21-n delays the phase of the high-frequency wave cos ωt by $-(n-1)\theta$ to generate a transmission wave TX to be outputted to an amplifier system 31-n. The amplifier system 31-n is a combination of one or more amplifiers and a filter. The output of the amplifier system 31-n is inputted to a circulator 40-n. The circulator 40-n outputs the amplified transmission wave TX to an antenna 50-n. In this way, when high-frequency waves cos ωt, cos(ωt−θ), ..., cos{ωt−(n−1)θ} are outputted as the transmit waves TX from the antennas 50-1, 50-2, ..., 50-n of the branch-1, branch-2, ..., branch-n, a beam is generated in the azimuth of ψ. If the antennas 50-1, 50-2, ..., 50-n are disposed straight in a row in this order at an interval of d, the azimuth angle of ψ is determined by the equation of d sin ψ=λθ/2Π, when the direction perpendicular to the row is set to 0 degrees, and the wavelength of the high-frequency wave is λ. As explained above, by supplying the antennas 50-1, 50-2, ..., 50-n with the high-frequency wave such that each adjacent two of the antennas radiates the transmit waves X having a predetermined phase difference therebetween, a beam can be generated in the direction depending on the phase difference.

On the other hand, the received wave (reflected wave) can be assumed to come substantially from the azimuth direction of ψ. The reflected wave received by the branch-n lags in phase by θ from the reflected wave received by the branch-(n−1).

Accordingly, when the reflected wave received by the branch-1 is cos(ωt+ϕ), the reflected wave received by the branch-2 is represented as cos(ωt+θ+ϕ), ..., and the reflected wave received by the branch-n is represented as cos(ωt+(n−1)θ+ϕ). Hence, the received wave is processed by each branch in the following way. Taking the branch-n as an example, the received wave RX is outputted from the antenna 50-n to an amplifier system 32-n through the circulator 40-n. The amplifier system 32-n is a combination of one or more amplifiers and a filter. The output of the amplifier system 32-n is inputted into a mixer 60-n. The mixer is also inputted with the output of the local oscillator 10 through a phase shifter 22-n. The phase shifter 22-n shifts the phase of the high-frequency wave cos ωt inputted thereto by (n−1)θ to generate a high frequency-wave cos{ωt+(n−1)θ} Accordingly, the output of the mixer 60-n is represented as cos ϕ. The outputs of the mixer 60-1, mixer 60-2, ..., mixer 60-n of the branch-1, branch-2, ..., mixer 60-n are all cos ϕ). The outputs of the mixer 60-1, mixer 60-2, ..., mixer 60-n are added up by a combining amplifier 70 to generate a received beam. The output (received beam) of the combining amplifier 70 is subjected to a radar process (a distance measuring process) for each value of the azimuth ψ.

In the phased array radar 100 shown in FIG. 5, it is not possible that the transmission distances between the local oscillator 10 and each of the phase shifters 21-1, 21-2, ..., 21-n and 22-1, 22-2, ..., 22-n are the same as one another. Also, it is difficult to make the differences in the transmission distances equal to integral multiples of the wavelength of the high-frequency wave. Accordingly, in the phased array radar 100, it is not possible that the high-frequency waves inputted into the phase shifters 21-1, 21-2, ..., 21-n and 22-1, 22-2, ..., 22-n are in the same phase. This prevents both the transmit bean and the received beam from having high directivities. Although the phase differences can be eliminated by performing calibration before shipment, it is not possible to eliminate phase errors due to secular variation or temperature variation in the high-frequency circuit section of the phased array radar 100.

The phased array radar 100 is required to be precisely set in the phase difference θ between the outputs of the transmitting-side phase shifters of each adjacent two of the branches, and also the phase difference θ between the outputs of the receiving-side phase shifters of each adjacent two of the branches. In the transmitting side, the phase difference θ may be ensured at the outputs of the amplifier systems 31-1, 31-2, ..., 32-n (the inputs of the circulators 40-1, 40-2, ..., 40-n) instead at the phase shifters.

To this end, the offset phase (the phase difference) between the adjacent phase shifters may be adjusted by the below described structure. Here, it is assumed that each of the phase shifters is constituted by a 90-degree hybrid coupler and two mixers. FIG. 6 is a block diagram showing, together with adjacent components of the phase array radar 100, a structure of a digital signal processor 900 for determining an offset between adjacent phase shifters. The configuration shown in FIG. 6 is for calculating an offset phase (a phase difference) between the outputs of the phase shifters 21-1 and 21-2. The output of the phase shifter 21-1 is branched into two components by the amplifier system 31-1, one of which is applied to one input terminal of a symmetrical mixer 80-12. Likewise, the output of the phase shifter 21-2 is branched into two components by the amplifier system 31-2, one of which is applied to the other input terminal of the symmetrical mixer 80-12. The digital signal processor 900 detects the output of the symmetrical mixer 80-12 through a low-pass filter 81-12 and an amplifier 82-12 in order to correct the phase of the output of the phase shifter 21-2. This phase correction is performed by a corrective phase shifter 25-2 which is disposed between the output of the phase shifter 21-2 and the input of the amplifier system 31-2, and operates in accordance with a correction command from the digital signal processor 900. The symmetrical mixer 80-12 is constituted by two mixers having the same structure to receive respectively two inputs supplied symmetrically, and configured to take a sum of these two inputs. The reason of using such a symmetrical mixer is that it is difficult to evenly treat two inputs to obtain a product of these two inputs by a conventional multiplier as explained below with reference to FIGS. 7A, 7B and 7C. FIG. 7A is a circuit diagram of a conventional multiplier of the differential input/differential output type using a Gilbert-cell. FIG. 7B is a block diagram schematically showing the structure of this conventional multiplier, in which the multiplier core is designated by M. As seen from FIG. 7A, two differential input terminals C and D of the multiplier core M are not in symmetrical positions with respect to each other. Accordingly, since the two differential input terminals C and D have different input impedances, the output of the multiplier may vary in phase. To remove this drawback, it is known, as shown in FIG. 7C, to duplex the predistortion stage (P and P') and the multiplier core (M and M'), one input I1 being applied to one input terminal C of the multiplier core M and one input terminal D' of the multiplier core M', the other input I2 being applied to the other input terminal D of the multiplier core M and the other input terminal C' of the multiplier core M'. By taking the sum of the outputs of the multiplier cores M and M', it is possible to obtain the product of the inputs I1 and I2 which have been treated symmetrically. For more details, refer to Hans-Martin Rein et al., "A Symmetrical Analog Wide-Band Multiplier IC Operating up to 8 Gb/s" IEEE ISSCC 1991, pp. 118-119.

Next, the structure of the digital signal processor 900 is explained with reference to FIG. 6. The output of the amplifier 82-12 is supplied to a calibration circuit 910 through a switch 931. The output of the amplifier 82-12 is also supplied to a phase-correcting voltage generation circuit 920 through a switch 932. The digital signal processor 900 also includes computation circuits 950 each of which supplies a phase command value to a corresponding one of the phase shifters, although only the phase command value supplied to the phase shifter 21-12 is shown in FIG. 6. Each computation circuit 950 calculates a phase command value θ for a corresponding one of the phase shifters (the phase shifter 21-2 in this example) on the basis of the output of a phase control voltage generation circuit 940, and output the values of cos θ and sine to the phase shifter 21-2. The calibration circuit 910 outputs an offset voltage to the amplifier 82-12, so that the output of the amplifier 82-12 is kept at 0 precisely when the input of the amplifier 82-12 is 0. The phase-correcting voltage generation circuit 920 supplies the corrective phase shifter 25-2 with a correction command value for correcting the phase of the output of the phase shifter 21-2 so that the phases of the outputs of the phase shifters 21-1 and 21-2 become coincident with each other when they receive the same phase command value.

The digital signal processor 900 operates in the following way. Here, it is assumed that the input of the amplifier 82-12 is 0. The input of the amplifier 82-12 may be set to 0 by setting the output of the local oscillator 10 to 0, or by setting the two inputs to the symmetrical mixer 80-12 to 0, or by setting the output of the symmetrical mixer 80-12 to 0, or by setting the output of the low-pass filter 81-1 to 0 by use of an appropriate switch. Since the output (analog voltage) of the amplifier 82-12 has to be 0 at this time, the switch 931 is turned on, and then the analog voltage is detected by the calibration circuit 910. Thereafter, the offset voltage outputted from the calibration circuit 910 to the amplifier 82-12 is adjusted so that the output of the amplifier 82-12 becomes 0. The calibration circuit 910 stores the value of the offset voltage in the form of a digital value. After the offset voltage of the amplifier 82-12 is adjusted, the switch 931 is turned off. Accordingly, digital signal processor 900 needs an A/D converter for converting the analog voltage outputted from the amplifier 82-12 into a digital value, and a D/A converter for converting the digital value indicative of the offset voltage for the calibration stored in the calibration circuit 910.

After the offset voltage of the amplifier 82-12 is adjusted, the phase difference between the outputs of the phase shifters 21-1 and 21-12 is corrected by the corrective phase shifter 25-2. When the correction is performed, the phase command value for the phase shifter 21-1 is set to a value indicating 0 degrees as a phase shift amount, and the phase command value for the phase shifter 21-2 is set to a value indicating 90 degrees as a phase shift amount. Accordingly, the high-frequency wave outputted from the local oscillator 10 and not shifted in phase by the phase shifter 21-1 enters the symmetrical mixer 80-12 after being amplified by the amplifier 31-1. On the other hand, the high-frequency wave outputted from the local oscillator 10 and shifted in phase by 90 degrees by the phase shifter 21-2 and subjected to phase correction as necessary at the corrective phase shifter 25-2 enters the symmetrical mixer 80-12 after being amplified by the amplifier 31-2. Hence, since the two inputs of the symmetrical mixer 80-12 are two high-frequency waves having the same frequency and a phase difference of 90 degrees therebetween, the product of these two inputs becomes 0. If the phase difference between the outputs of the phase shifter 21-1 and 21-2 is (90+δ) degrees, a DC analog voltage proportional to sin δ is outputted from the amplifier 82-12. In this case, the switch 932 is turned on to detect this analog voltage by the phase-correcting voltage generation circuit 920. The phase-correcting voltage generation circuit 920 adjusts a phase-correcting value outputted to the corrective phase shifter 25-2 to make the output of the amplifier 82-12 equal to 0. After the phase-correcting value is adjusted, the switch 932 is turned off. Accordingly, the digital signal processor 900 needs an A/D converter for converting the analog voltage outputted from the amplifier 82-12 into a digital value, and a D/A converter for converting the digital value indicative of the phase-correcting value stored in the phase-correcting voltage generation circuit 920.

In the above described way, the phase of the output of the phase shifter 21-2 is precisely corrected with respect to the phase of the output of the phase shifter 21-1. This process is performed for each adjacent two of all the transmitting-side phase shifters, so that the phase of the output of each of the phase shifters 21-2, 21-3, ..., 21-(n−1) and 21-n is precisely corrected with respect to the phase of the output of the phase shifter 21-1. By performing the similar process as above, the phase of the output of each of the receiving-side phase shifters 22-2, 22-3, ..., 22-(n−1) and 22-n is precisely corrected with respect to the phase of the output of the phase shifter 22-1.

As explained above, each of the calibration circuit 910 and the phase-correcting voltage generation circuit 920 needs an A/D converter. This makes the circuit structure of the digital signal processor 900 larger. It is possible to configure one A/D converter to operate as both the A/D converter of the calibration circuit 910 and the A/D converter of the phase-correcting voltage generation circuit 920. In this case, the range of the input voltage of the calibration circuit 910 has to be the same as that of the phase-correcting voltage generation circuit 920. However, since each of the phase shifters 21-1 to 21-n and 22-1 to 22-n is an infinite phase shifter, and the phase-correcting value outputted to the corrective phase shifter 25-2 ranges from 0 to 360 degrees, the accuracy of phase correction at the corrective phase shifter 25-2 is likely to degrade in this case. Furthermore, the digital signal processor 900 needs 2 (n−1) corrective phase shifters for both the transmitting side and the receiving side. This also prevents making the digital signal processor 900 compact in circuit structure.

SUMMARY OF THE INVENTION

The present invention provides a digital signal processor for correcting a DC output at an output terminal of an internal circuit of an analog circuit device, comprising:

a digital register for storing a digital value;

a D/A converter for converting the digital value stored in the digital register into an analog voltage and applying the converted analog voltage to the output terminal as the DC output;

a polarity determining circuit which outputs a first signal when an analog DC voltage at a reference correction point different from the output terminal in the internal circuit is higher than a predetermined threshold value and outputs a second signal when the analog DC voltage is lower than or equal to the predetermined threshold value; and an updating function of varying the digital value stored in the digital register in accordance with output of the polarity determining circuit;

the updating function being configured to monotonously increase or decrease the digital value while a predetermined one of the first and second signals is outputted from the polarity determining circuit.

The present invention also provides a digital signal processor for controlling an analog circuit device comprising:

a first digital register for storing a first digital value in accordance with which the analog circuit device is controlled;

a second digital register for storing a second digital value;

an adder for generating a correction command value by adding the first digital value and the second digital value, and outputting the correction command value to the analog circuit device;

a polarity determining circuit which outputs a first signal when an analog DC voltage at a reference correction point in the analog circuit device is higher than a predetermined threshold value and outputs a second signal when the analog voltage is lower than or equal to the predetermined threshold value; and an updating function of varying the second digital value stored in the second digital register in accordance with output of the polarity determining circuit;

the updating function being configured to monotonously increase or decrease the second digital value while a predetermined one of the first and second signals is outputted from the polarity determining circuit.

According to the present invention, it becomes possible to control an analog circuit device such as a phased array radar by a digital signal processor which does not include A/D converters nor corrective phase shifters.

Other advantages and features of the invention will become apparent from the following description including the drawings and claims.

PREFERRED EMBODIMENTS OF THE INVENTION

First Embodiment

Figure 1:
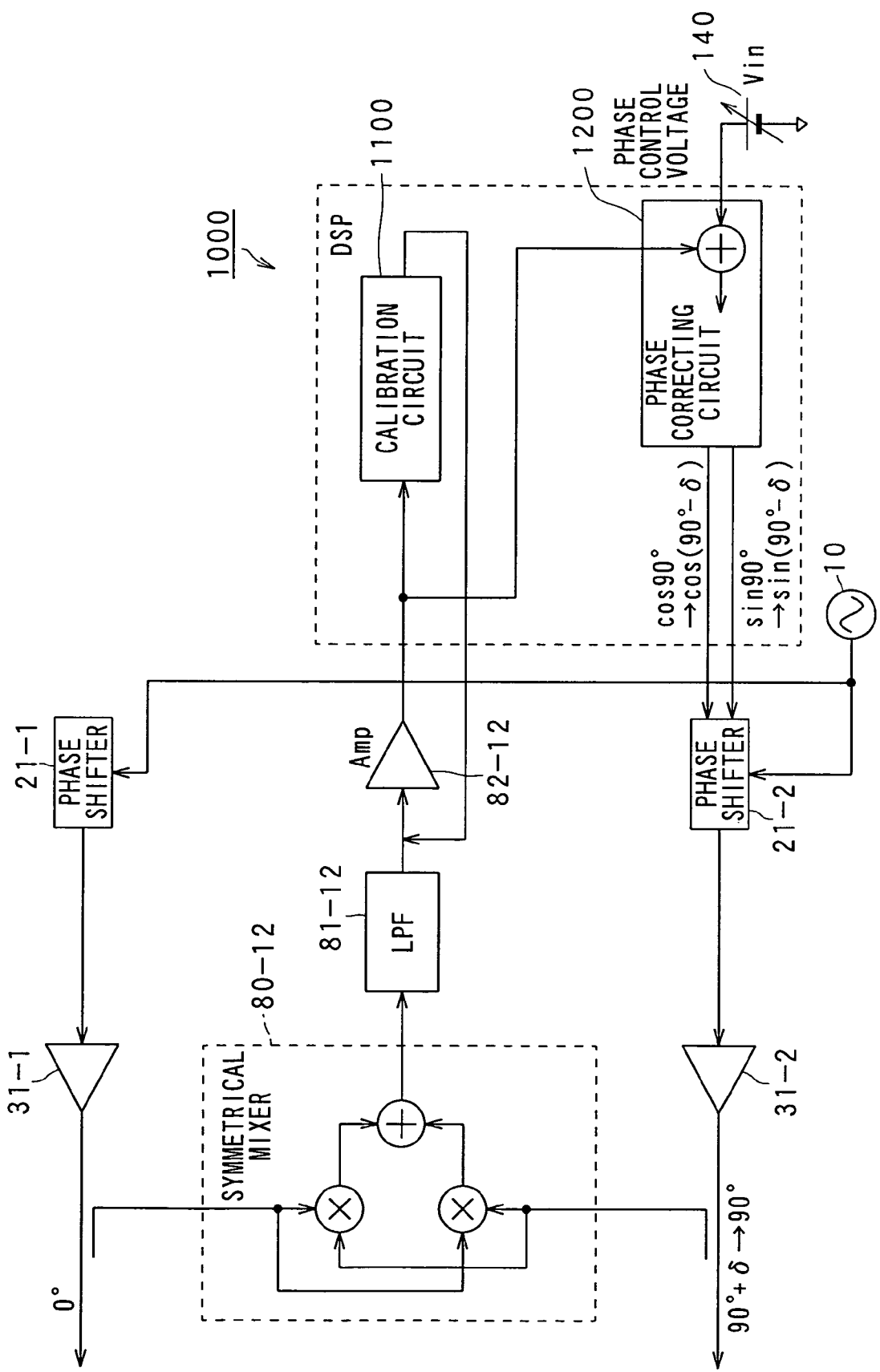
FIG. 1 is a block diagram showing the structure of a digital signal processor according to a first embodiment of the invention.
Figure 5:
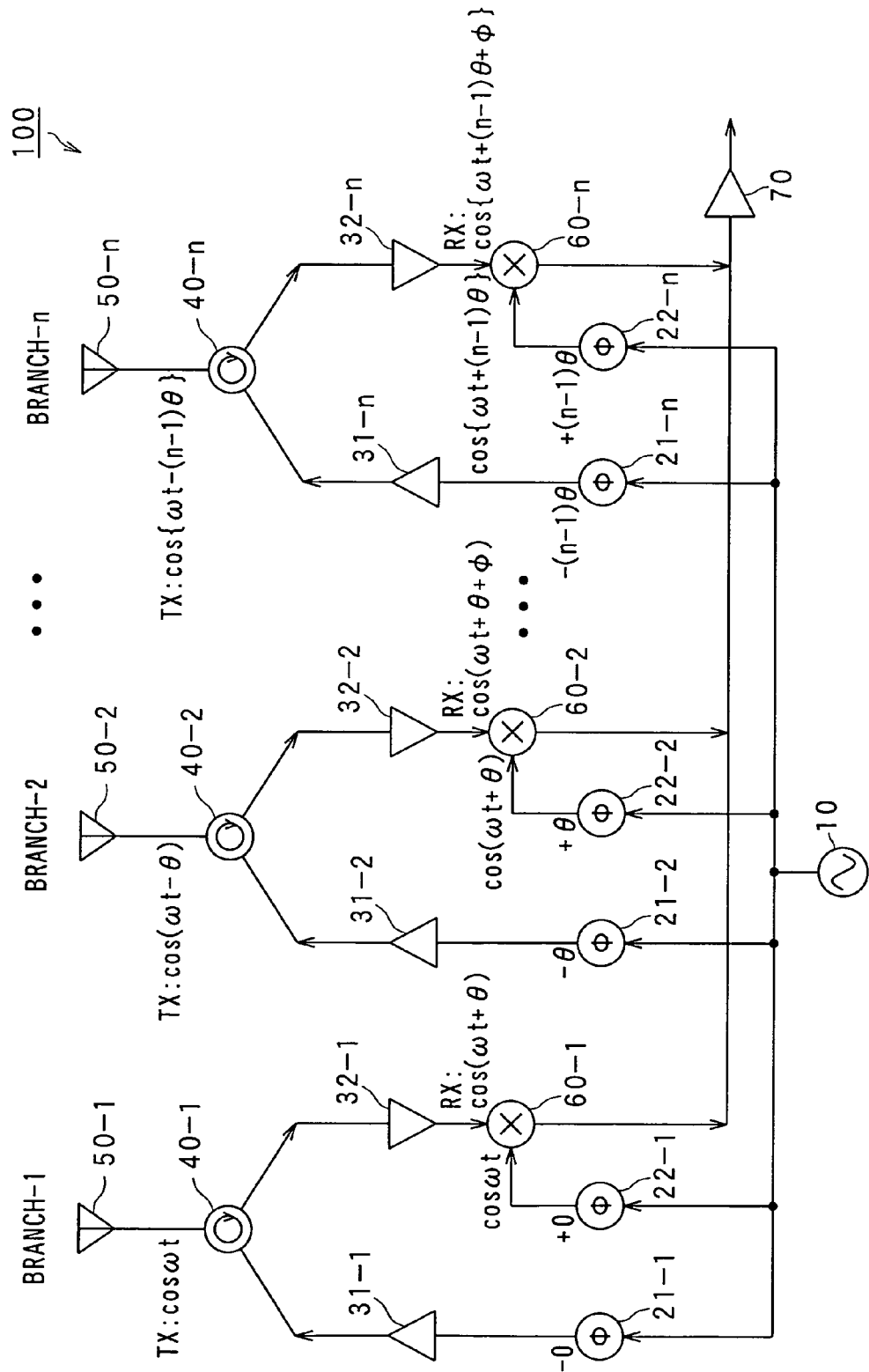
FIG. 5 is a block diagram showing the structure of a phased array radar.

FIG. 1 is a block diagram showing, together with adjacent components of the phased array radar 100 shown FIG. 5, a structure of a digital signal processor 1000 according to a first embodiment of the invention In the following, the parts that are the same as those shown in the previous figures are given the same reference numerals or characters, and explanation thereof will be omitted. The configuration shown in FIG. 1 is for calculating an offset phase (phase difference) between the outputs of the phase shifters 21-1 and 21-2 of the phased array radar 100. The output of the phase shifter 21-1 is branched into two components by the amplifier system 31-1, one of which is applied to one input terminal of the symmetrical mixer 80-12. Likewise, the output of the phase shifter 21-2 is branched into two components by the amplifier system 31-2, one of which is applied to the other input terminal of the symmetrical mixer 80-12. The digital signal processor 1000 detects the output of the symmetrical mixer 80-12 through the low-pass filter 81-12 and the amplifier 82-12 in order to correct the phase command value itself outputted to the phase shifter. Accordingly, the structure shown in FIG. 1 does not need the corrective phase shifter 25-2 which the structure shown in FIG. 6 needs. The symmetrical mixer 80-12 may be the one shown in FIGS. 7A and 7B. The digital signal processor 1000 includes a calibration circuit 1100 for compensating the offset voltage of the amplifier 82-12, and a phase correcting circuit 1200 for correcting the offset phase (the phase difference) between the adjacent phase shifters (between the phase shifters 21-1 and 21-2 in FIG. 1).

Figure 2:
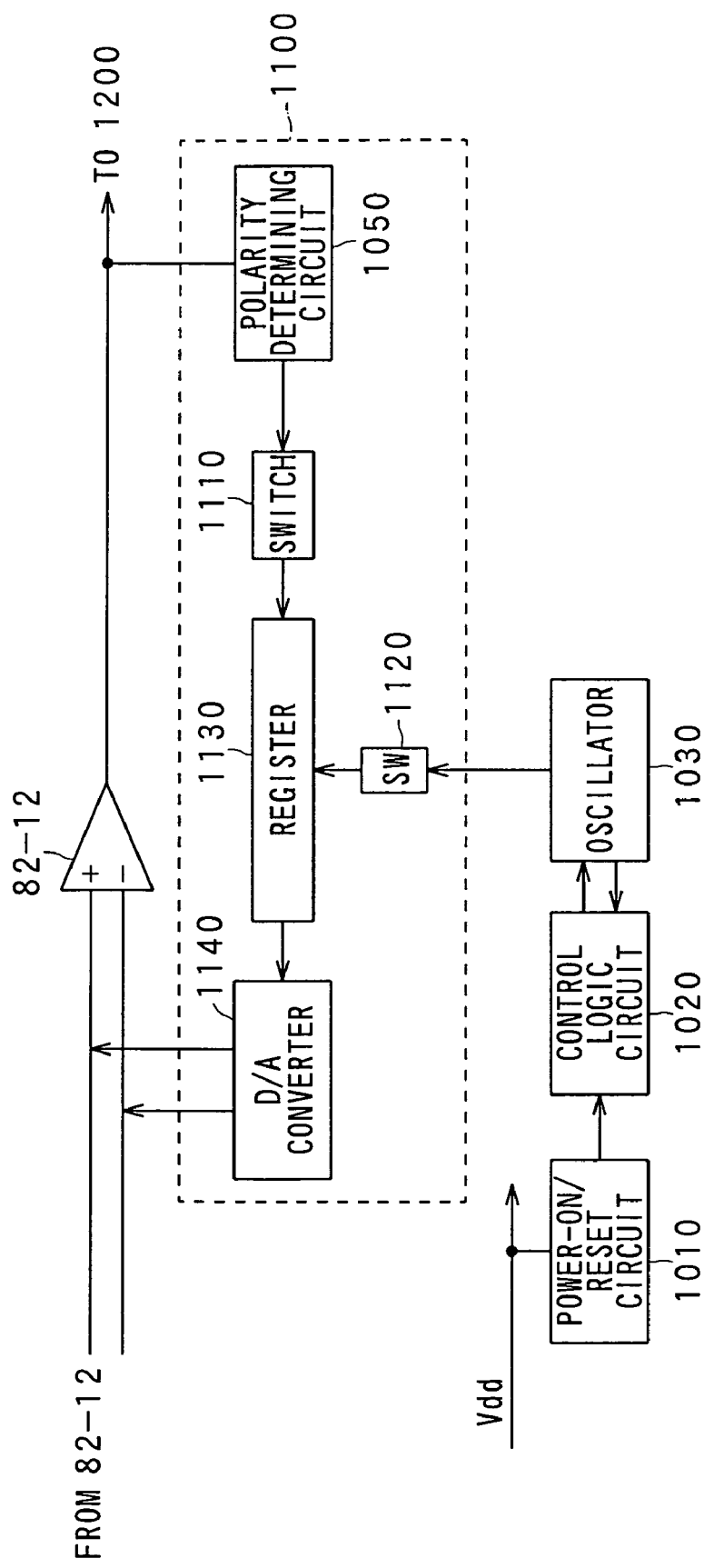
FIG. 2 is a block diagram showing the structure of a calibration circuit included in the digital signal processor according to the first embodiment of the first invention.

FIG. 2 is a block diagram showing the structure of the calibration circuit 1100. The calibration circuit 1100 includes a polarity determining circuit 1050, switches 1110 and 1120, a register 1130 and a D/A converter 1030. FIG. 2 also shows a power-on/reset circuit 1010, a control logic circuit 1020 and a clock 1030 included in the digital signal processor 1000. The amplifier 82-12 is a differential input type amplifier.

The calibration circuit 1100 operates in the following way. When the digital signal processor 1000 is powered on, the register 113 is reset to a predetermined initial value by the power-on/reset circuit 1010. The initial value is set to a maximum positive value of the voltage to be generated as an offset compensating voltage. The D/A converter 1140 reads the value stored in the register 1130 to generate an analog voltage to compensate two inputs of the amplifier 82-1. At this time, the amplifier 82-12 receives no input other than these analog voltages by an appropriate switch operation, and accordingly, the output of the amplifier 82-12 becomes positive. Also, the switches 1110 and 1120 are turned on by the control logic circuit 1020. The output of the amplifier 82-12 is inputted into the polarity determining circuit 1050. The polarity determining circuit 1050 compares the output (analog voltage) of the amplifier 82-12 with a predetermined threshold. This threshold is a ground potential voltage (0 V) in this embodiment. When the output of the amplifier 82-12 is positive, the polarity determining circuit 1050 outputs a signal to decrease the value stored in the register 1130 (may be referred to as "register value" hereinafter) to the register 1130 through the switch 1110. On the other hand, when the output of the amplifier 82-12 is negative, the polarity determining circuit 1050 does not output such a signal, but sends a signal indicative of completion of the compensation to the control logic circuit 1020.

The control logic circuit 1020 performs a subtracting operation to decrease the register value through the clock circuit 1030. In more detail, the control logic circuit 1020 decreases the register value, for example by one, each time the register 1130 receives a clock pulse from the clock circuit 1030 through the switch 1120 while the polarity determining circuit 1050 outputs the signal to decrease the register value to the register 1130 through the switch 1110. The D/A converter 1140 converts the updated value stored in the register 1130, that is the register value having been subtracted by one, into an analog voltage by which the two inputs of the amplifier 82-1 are compensated. The output of the amplifier 82-1 at this time is lower than that when the amplifier 82-1 was powered on.

Thereafter, the register value is subtracted successively until the polarity determining circuit 1050 determines that the output of the amplifier 82-1 is 0 or negative. Immediately after the polarity determining circuit 1050 determines that the output of the amplifier 82-1 is 0 or negative, the signal indicative of completion of the compensation is sent to the control logic circuit 1020. As a result, the control logic circuit 1020 turns off the switches 1110 and 1120, and stops the subtracting operation of the register value.

Figure 3:
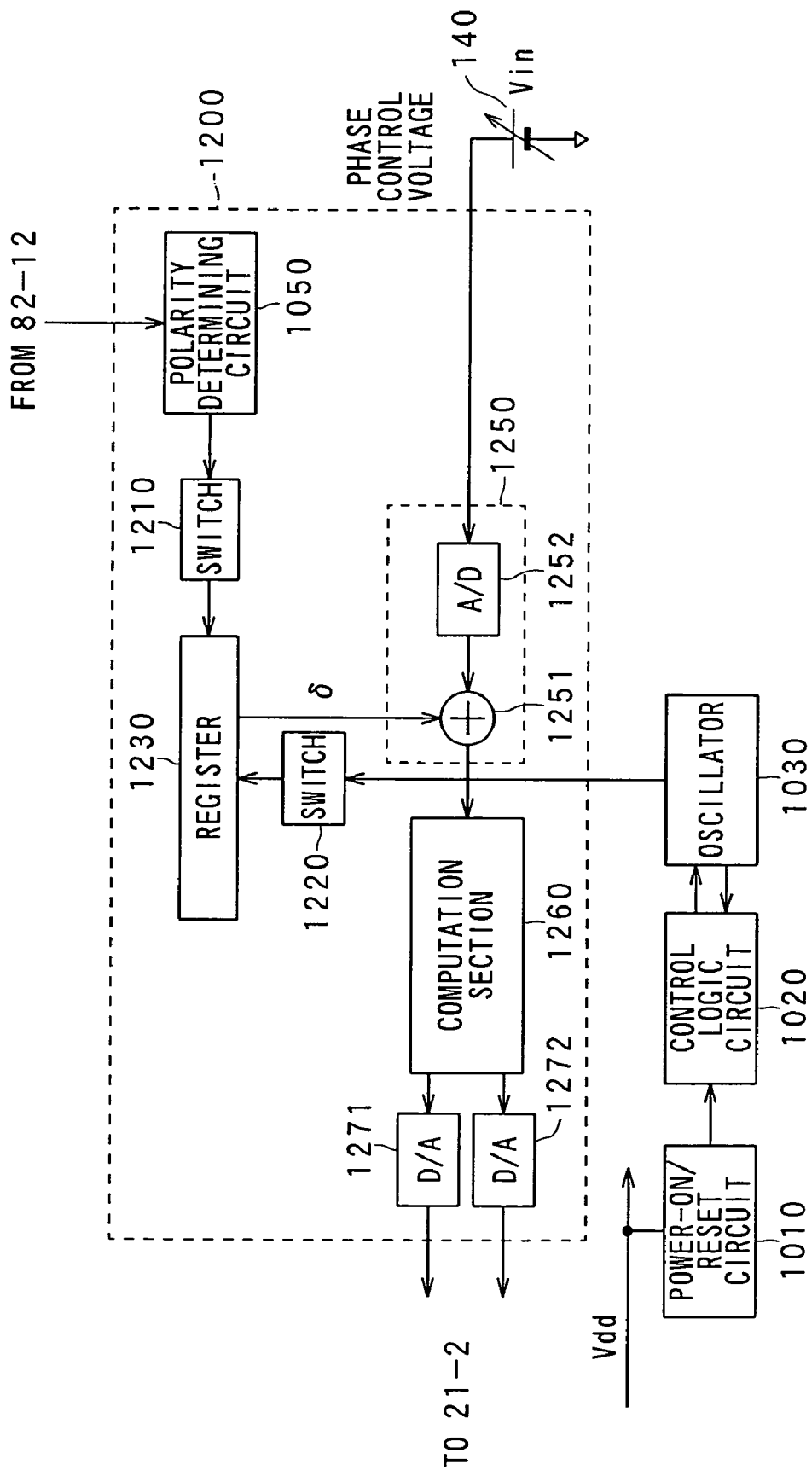
FIG. 3 is a block diagram showing the structure of a phase correcting circuit included in the digital signal processor according to the first embodiment of the invention.

FIG. 3 is a block diagram showing the structure of the phase correcting circuit 1200 included in the digital signal processor 1000. The phase correcting circuit 1200 includes the polarity determining circuit 1050, switches 1210 and 1220, a register 1230, an adder 1250, a computation section 1260 and D/A converters 1271 and 1272. The polarity determining circuit 1050 is also used by the calibration circuit 1100. FIG. 3 also shows the power-on/reset circuit 1010, the control logic circuit 1020 and the clock circuit 1030 included in the digital signal processor 1000.

The calibration circuit 1200 operates in the following way. Here, it is assumed that the calibration circuit 1100 has completed the compensation of the offset voltage of the amplifier 82-12. When the digital signal processor 1000 is powered on, the register 1230 is reset to a predetermined initial value by the power-on/reset circuit 1010. The initial value is set to a maximum positive value corresponding to a phase angle of 180 degrees (Π), for example. The value stored in the register 1230 (may be referred to as "register value" hereinafter) is outputted to the adder 1250 where the register value is added with the digital value which the A/D converter 1252 generates by A/D-converting the output voltage of a phase control voltage generation circuit 140, in order to generate the phase command value θ. The computation section 1260 calculates the values of cos θ and sin θ, which are converted into analog values respectively by the D/A converters 1271 and 1272, and supplied to the phase shifter 21-2. At this time, the control logic circuit 1020 turns on the switches 1210 and 1220.

The phase shifter 21-1 receives the sine and cosine of the phase command value indicative of 0 degrees, and the phase shifter 21-2 receives the sine and cosine of the phase command value indicative of around 90 degrees. As explained in FIG. 3, although the phase control voltage generation circuit 140 outputs the voltage corresponding to the phase command value θ corresponding to a phase angle of 90 degrees during the compensation, the phase shifter 21-2 is inputted with cos(θ+δ) and sin(θ+δ) when the value stored in the register 12 is δ. Accordingly, the symmetrical mixer 80-12 mixes the high-frequency wave whose phase has not been shifted at the phase shifter 21-1 with the high-frequency wave whose phase has been shifted by 90+δ at the phase shifter 21-2, and the amplifier 82-1 outputs a voltage corresponding to the DC component sin δ.

The output of the amplifier 82-12 is inputted into the polarity determining circuit 1050. The polarity determining circuit 105 compares the output (analog voltage) of the amplifier 82-12 with a predetermined threshold. This threshold is a ground potential voltage (0V) in this embodiment. When the output of the amplifier 82-12 is positive, the polarity determining circuit 1050 outputs a signal to decrease the value stored in the register 1230 (may be referred to as "register value" hereinafter) to the register 1230 through the switch 1210. On the other hand, when the output of the amplifier 82-12 is negative, the polarity determining circuit 1050 does not output such a signal, but sends a signal indicative of completion of the compensation to the control logic circuit 1020.

The control logic circuit 1020 performs a subtracting operation on the register 1230 through the clock circuit 1030. In more detail, the control logic circuit 1020 decreases the register value by one, for example, each time the register 1230 receives a clock pulse from the clock circuit 1030 through the switch 1220 while the polarity determining circuit 1050 outputs the signal to decrease the register value to the register 1210 to the register 1230. In this way, the compensation angle δ corresponding to the register value is updated, and the register value is subtracted successively until the polarity determining circuit 1050 determines that the output of the amplifier 82-12 is 0 or negative. Immediately after the polarity determining circuit 1050 determines that the output of the amplifier 82-12 is 0 or negative, the signal indicative of completion of the compensation is sent to the control logic circuit 1020. As a result, the control logic circuit 1020 turns off the switches 1210 and 1220, and stops subtraction of the register value.

Thus, the phase of the output of the phase shifter 21-1 with respect to the phase of the output of the phase shifter 21-2 is precisely compensated. This process is performed for each adjacent two of all the transmitting-side phase shifters, so that the phase of the output of each of the phase shifters 21-2, 21-3, . . . , 21-(n-1) and 21-n is precisely corrected with respect to the phase of the output of the phase shifter 21-1. By performing the similar process as above, the phase of the output of each of the receiving-side phase shifters 22-2, 22-3, . . . , 22-(n-1) and 22-n is precisely corrected with respect to the phase of the output of the phase shifter 22-1.

In this embodiment, any A/D converter for converting the output of the amplifier 82-12 into a digital value is not needed, and the polarity determining circuit 1050 can be commonly used for all the phase shifters. Although the symmetrical mixer cannot be commonly used, the low-pass filter and the amplifier disposed on the output side of the symmetrical mixer can be commonly used.

Figure 6:
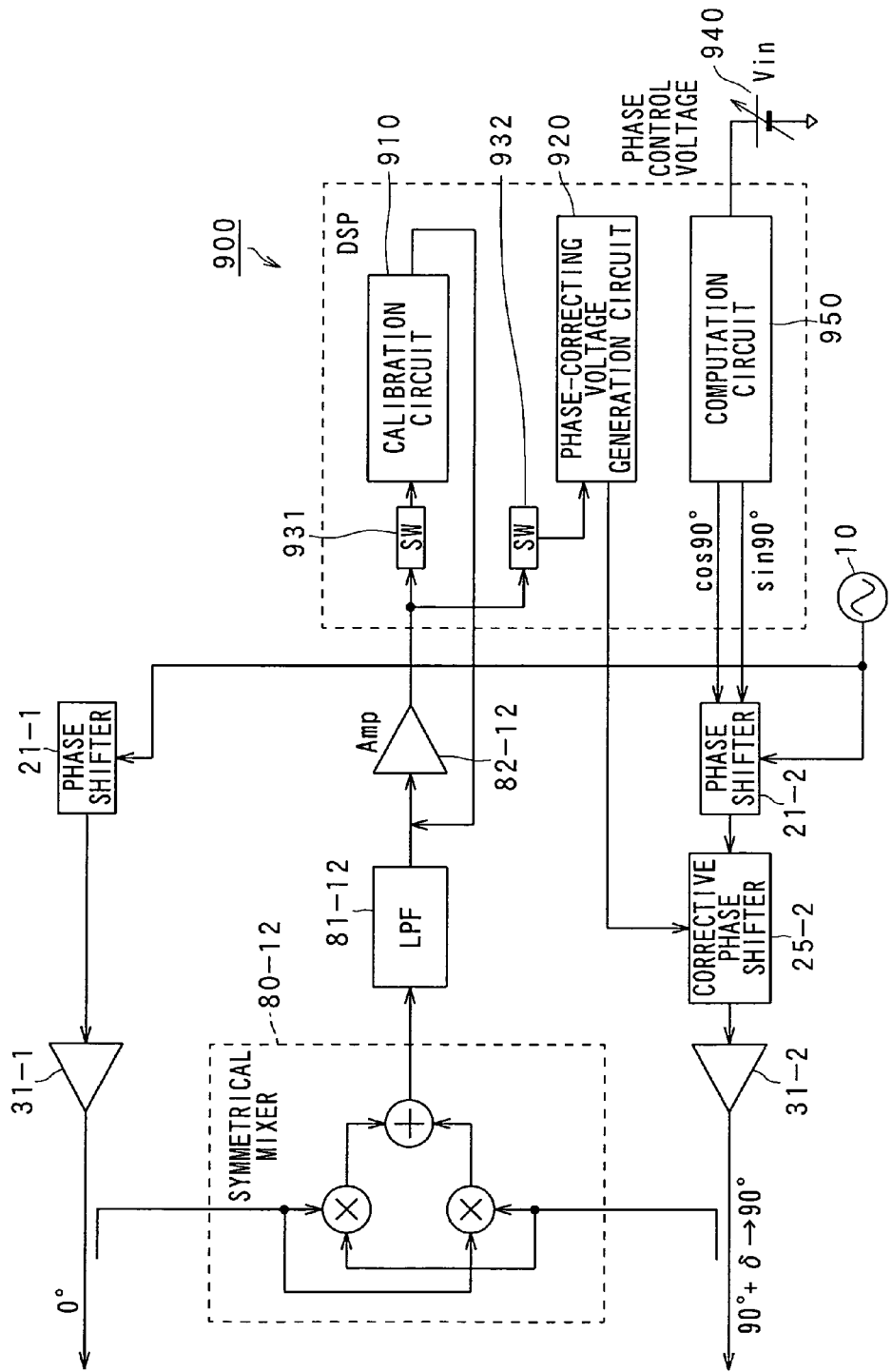
FIG. 6 is a block diagram showing a structure of a conventional digital signal processor for compensating an offset phase (a phase difference) between adjacent phase shifters included in the phased array radar shown in FIG. 5, together with adjacent components.
Figure 7A:
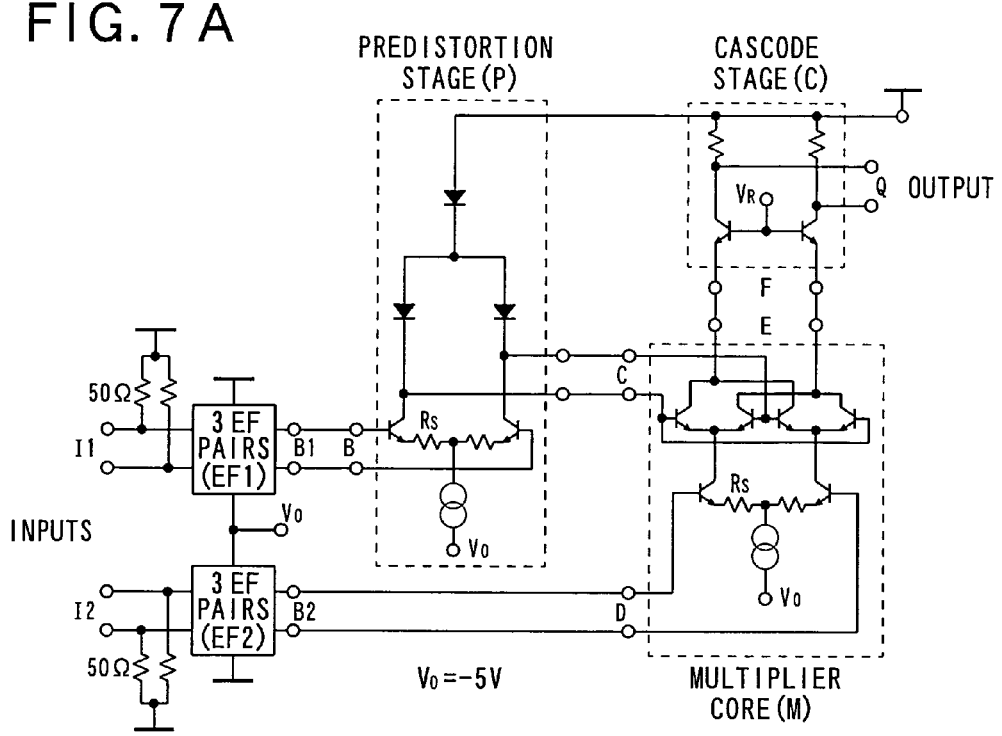
FIGS. 7A to 7C are diagrams for explaining the structure of a symmetrical mixer usable in a phased array radar.
Figure 7B:
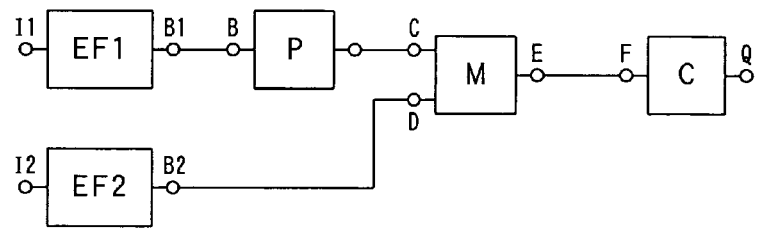
Figure 7C:
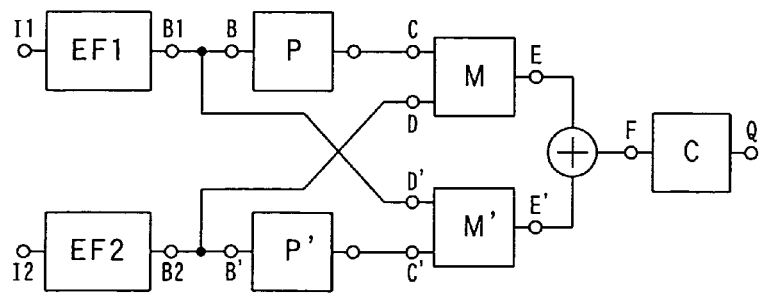

Furthermore, the corrective phase shifter 25-2 which the structure shown in FIG. 6 needs is not needed in this embodiment. Hence, according to this embodiment, the 2 (n-1) corrective phase shifters 21-2 to 21-n and 22-2 to 22-n become unnecessary. As understood from the above description, the digital signal processor 1000 for compensating the offset of each phase shifter to generate a high-directivity transmit beam and a high-directivity received beam can be made compact in size.

Second Embodiment

Figure 4:
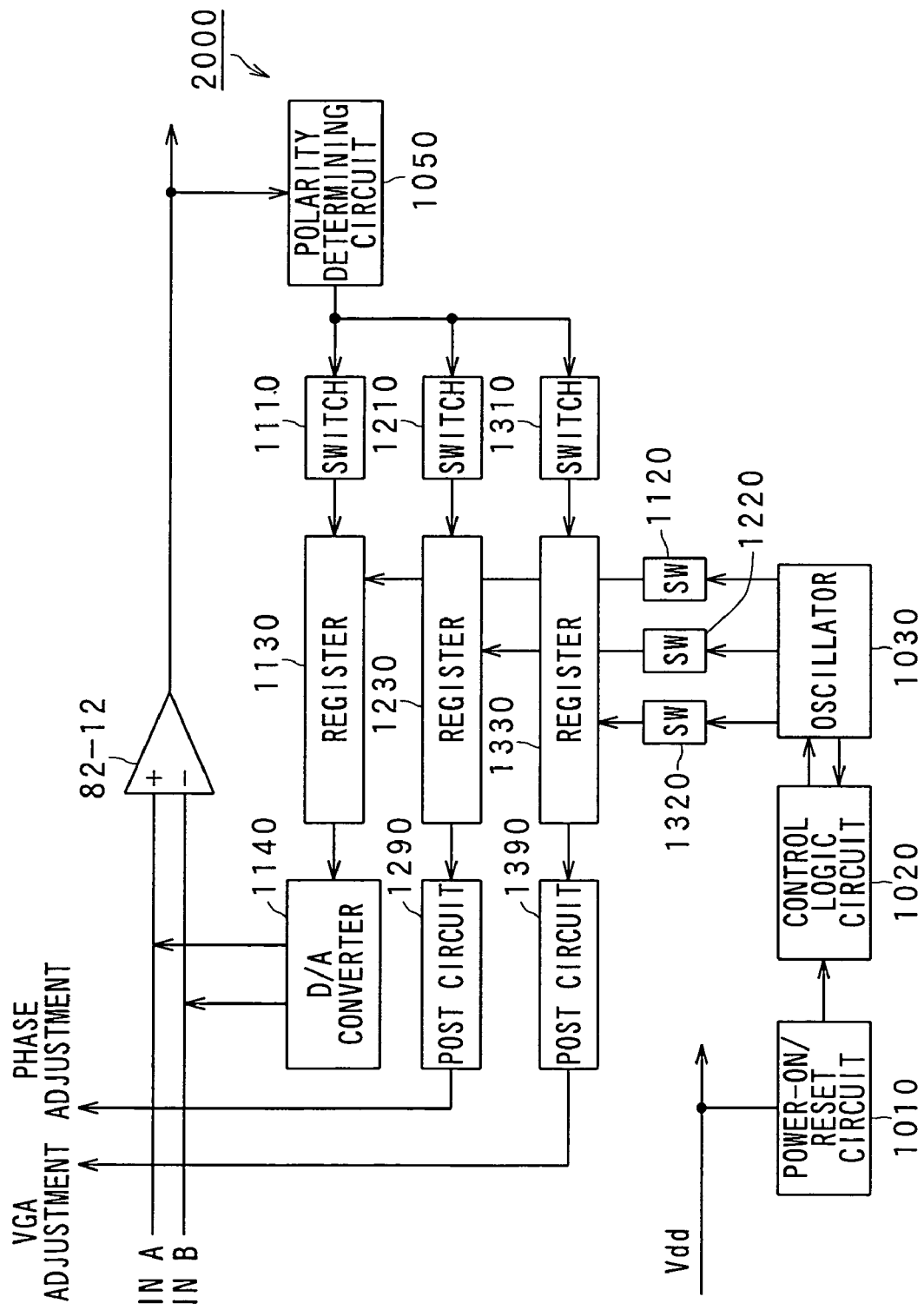
FIG. 4 is a block diagram showing the structure of a digital signal processor according to a second embodiment of the invention.

FIG. 4 is a block diagram showing a structure of a digital signal processor 2000 according to a second embodiment of the invention. The digital signal processor 2000 is different from the digital signal processor shown in FIG. 1 in that it is additionally provided with a structure which enables adjusting another circuit such as a VGA (video graphic array). The digital signal processor 2000 includes, as a common structure thereof, the power-on/reset circuit 1010, the control logic circuit 1020, the clock circuit 1030 and the polarity determining circuit 1050. The digital signal processor 2000 also includes the structure of the calibration circuit 1100 shown in FIG. 2 constituted of the polarity determining circuit 1050 commonly used, the switches 1110 and 1120, the register 1130 and the D/A converter 1140. The digital signal processor 2000 also includes the structure of the phase correcting circuit 1200 shown in FIG. 3 constituted of the polarity determining circuit 1050 commonly used, the switches 1210 and 1220, the register 1230 and a post circuit 1290. The post circuit 1290 is constituted of the adder 1250, the computation section 1260 and the D/A converters 1271 and 1272 shown in FIG. 3. The digital signal processor 2000 also includes a structure, which is similar to the structure of the phase correcting circuit 1200 shown in FIG. 3, constituted of the polarity determining circuit 1050 commonly used, the switches 1310 and 1320, the register 1330 and a post circuit 1390. The post circuit 1390 is constituted of a VGA-adjusting circuit and a D/A converter. Like the digital signal processor 1000 shown in FIG. 1 described in the first embodiment, the digital signal processor 2000 can compensate the offset voltage of the amplifier 82-12, and the offset phase between each adjacent two the phase shifters. In addition, the digital signal processor 2000 can be configured to terminate adjustment on the VGA by setting the output of the amplifier 82-12 to 0 by use of an appropriate circuit.

The present invention is applicable to any digital signal processor which includes a polarity determining circuit commonly used for two or more circuits to be adjusted in the offsets in their outputs amplified by amplifiers, and is configured to terminate adjustment of each circuit when the output of a corresponding one of the amplifiers become 0.

The above explained preferred embodiments are exemplary of the invention of the present application which is described solely by the claims appended below. It should be understood that modifications of the preferred embodiments may be made as would occur to one of skill in the art.

What is claimed is:

1. A digital signal processor for controlling an analog circuit device comprising:
a first digital register for storing a first digital value in accordance with which said analog circuit device is controlled;
a second digital register for storing a second digital value;
an adder for generating a correction command value by adding said first digital value and said second digital value, and outputting said correction command value to said analog circuit device;
a polarity determining circuit which outputs a first signal when an analog DC voltage at a reference correction point in said analog circuit device is higher than a predetermined threshold value and outputs a second signal when said analog voltage is lower than or equal to said predetermined threshold value; and
an updating function of varying said second digital value stored in said second digital register in accordance with output of said polarity determining circuit;
said updating function being configured to monotonously increase or decrease said second digital value while a predetermined one of said first and second signals is outputted from said polarity determining circuit, wherein said correction command value is data for controlling a phase of an output of a high-frequency phase shifter included in said analog circuit device, said correction reference point being one of an output terminal of said high-frequency phase shifter and an output terminal of a mixer inputted with said output of said high-frequency phase shifter and a reference high-frequency wave.

2. A digital signal processor for correcting a DC output at an output terminal of an internal circuit of an analog circuit device, comprising:
a digital register for storing a digital value;
a D/A converter for converting said digital value stored in said digital register into an analog voltage and applying said converted analog voltage to said output terminal as said DC output;
a polarity determining circuit which outputs a first signal when an analog DC voltage at a reference correction point different from said output terminal in said internal circuit is higher than a predetermined threshold value and outputs a second signal when said analog DC voltage is lower than or equal to said predetermined threshold value; and
an updating function of varying said digital value stored in said digital register in accordance with output of said polarity determining circuit;
said updating function being configured to monotonously increase or decrease said digital value while a predetermined one of said first and second signals is outputted from said polarity determining circuit, wherein a phased array radar comprises an array of antennas each including a phase shifter to generate a transmit beam and a received beam, and said digital signal processor is provided for each of said antennas, a phase of said phase shifter being controlled depending on said DC output to correct an offset phase between said phase shifters of each adjacent two of said antennas.

3. A digital signal processor for controlling an analog circuit device comprising:
a first digital register for storing a first digital value in accordance with which said analog circuit device is controlled;
a second digital register for storing a second digital value;
an adder for generating a correction command value by adding said first digital value and said second digital value, and outputting said correction command value to said analog circuit device;
a polarity determining circuit which outputs a first signal when an analog DC voltage at a reference correction point in said analog circuit device is higher than a predetermined threshold value and outputs a second signal when said analog voltage is lower than or equal to said predetermined threshold value; and
an updating function of varying said second digital value stored in said second digital resister in accordance with output of said polarity determining circuit;
said updating function being configured to monotonously increase or decrease said second digital value while a predetermined one of said first and second signals is outputted from said polarity determining circuit, wherein a phased array radar comprises an array of antennas each including a phase shifter to generate a transmit beam and a received beam, said digital signal processor is provided for each of said antennas, a phase of said phase shifter being controlled depending on said correction command value to correct an offset phase between said phase shifters of each adjacent two of said antennas.

* * * * *